(12) United States Patent
An et al.

(10) Patent No.: US 12,088,665 B2
(45) Date of Patent: Sep. 10, 2024

(54) DATA REPLICATION PROCESSING METHOD BETWEEN MANAGEMENT MODULES IN RUGGED ENVIRONMENT

(71) Applicant: Korea Electronics Technology Institute, Seongnam-si (KR)

(72) Inventors: Jae Hoon An, Incheon (KR); Young Hwan Kim, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 17/497,183

(22) Filed: Oct. 8, 2021

(65) Prior Publication Data
US 2022/0150304 A1 May 12, 2022

(30) Foreign Application Priority Data
Nov. 6, 2020 (KR) .................. 10-2020-0147256

(51) Int. Cl.
*H04L 67/1095* (2022.01)
*H04L 41/12* (2022.01)
*H04L 67/12* (2022.01)

(52) U.S. Cl.
CPC .......... *H04L 67/1095* (2013.01); *H04L 41/12* (2013.01); *H04L 67/12* (2013.01)

(58) Field of Classification Search
CPC ...... G06F 11/07; G06F 11/2023; H04L 67/12; H04L 67/1095; H04L 41/12;
(Continued)

(56) References Cited

U.S. PATENT DOCUMENTS 7,546,366 B2 * 6/2009 Vainio ................. H04L 67/1001
370/254
7,840,992 B1 * 11/2010 Dufrene .............. G06F 11/1461
726/1
(Continued)

FOREIGN PATENT DOCUMENTS

KR    10-2009-0101921 A    9/2009

OTHER PUBLICATIONS

Korean Office Action issued on Mar. 7, 2022, in counterpart Korean Patent Application No. 10-2020-0147256 (3 pages in English and 5 pages in Korean).

*Primary Examiner* — Tonia L Dollinger
*Assistant Examiner* — Linh T. Nguyen
(74) *Attorney, Agent, or Firm* — NSIP Law (57) ABSTRACT

There is provided a method of data replication between management modules in a rugged environment. According to an embodiment of the present disclosure, an edge server management module replication method includes: a step of collecting, by a first management module, environment information of an edge server; a step of managing, by the first management module, the edge server, based on the collected environmental information; a first storage step of storing, by the first management module, management data related to the edge server in a repository of the first management module; and a second storage step of storing, by a second management module, the management data stored at the first storage step in a repository of the second management module. Accordingly, the time required to respond to an error occurring in a severe industrial site can be minimized through data replication processing between replicated edge management modules in a rugged environment, so that a continuous edge service can be provided without interruption.

11 Claims, 5 Drawing Sheets

(58) Field of Classification Search
CPC ..... H04L 67/1097; H04L 45/02; H04L 67/14; H04L 1/22
See application file for complete search history.

(56) References Cited

U.S. PATENT DOCUMENTS

| | | | | |
|---|---|---|---|---|
| 8,102,759 | B2* | 1/2012 | Wang | H04W 40/24 370/242 |
| 8,966,318 | B1* | 2/2015 | Shah | G06F 11/3664 714/28 |
| 9,077,617 | B1* | 7/2015 | Seth | H04L 69/40 |
| 9,507,685 | B2* | 11/2016 | Gondi | G06F 11/2033 |
| 9,535,806 | B1* | 1/2017 | Cong | G06F 11/0727 |
| 2002/0161789 | A1* | 10/2002 | Schaefer | G06F 11/1666 707/999.203 |
| 2002/0194276 | A1* | 12/2002 | Endo | G06F 11/1482 709/205 |
| 2005/0025179 | A1* | 2/2005 | McLaggan | H04L 45/38 370/468 |
| 2005/0198327 | A1* | 9/2005 | Iwamura | H04L 29/12066 709/225 |
| 2009/0222498 | A1* | 9/2009 | Lu | G06F 16/10 |
| 2010/0064165 | A1* | 3/2010 | Kambara | G06F 11/2028 714/E11.055 |
| 2011/0218967 | A1* | 9/2011 | Sliger | G06F 11/1451 711/E12.001 |
| 2013/0103977 | A1* | 4/2013 | Zimmermann | G06F 11/2046 714/4.11 |
| 2013/0275808 | A1* | 10/2013 | McNeeney | 714/20 |
| 2015/0067084 | A1 | 3/2015 | Yeh et al. | |
| 2015/0350077 | A1* | 12/2015 | Durrani | H04L 45/58 709/225 |
| 2016/0077936 | A1* | 3/2016 | Tang | G06F 11/2097 714/4.11 |
| 2016/0085650 | A1* | 3/2016 | Kadayam | G06F 11/2082 714/6.23 |
| 2017/0060694 | A1* | 3/2017 | Makhov | G06F 16/113 |
| 2017/0242599 | A1* | 8/2017 | Patnaik | G06F 11/1662 |
| 2018/0062922 | A1* | 3/2018 | Tian | G06F 11/07 |
| 2018/0336103 | A1* | 11/2018 | Sekar | G06F 16/183 |
| 2018/0337989 | A1* | 11/2018 | Gillespie | A63F 13/69 |
| 2019/0278672 | A1* | 9/2019 | Jin | G06F 11/2089 |
| 2020/0026440 | A1* | 1/2020 | Killamsetti | G06F 3/0619 |
| 2020/0073772 | A1* | 3/2020 | Andre | G06F 11/3034 |
| 2020/0186410 | A1* | 6/2020 | Osawa | H04L 69/40 |
| 2020/0195415 | A1* | 6/2020 | Evans | H04L 7/0041 |
| 2020/0371651 | A1* | 11/2020 | Lau | G06F 8/65 |

* cited by examiner

DATA REPLICATION PROCESSING METHOD BETWEEN MANAGEMENT MODULES IN RUGGED ENVIRONMENT

PRIORITY

This application is based on and claims priority under 35 U.S.C. § 119 to Korean Patent Application No. 10-2020-0147256, filed on Nov. 6, 2020, in the Korean Intellectual Property Office, the disclosure of which is herein incorporated by reference in its entirety.

BACKGROUND

Field

The present disclosure relates generally to edge service management technology, and more particularly, to replication technology of an edge management means in providing an edge service in a rugged environment.

Description of Related Art

In a rugged environment (severe environment), IT equipment is difficult to operate normally, and management and control therefor is more highlighted. However, current technology for overcoming the rugged environment only focuses on hardware-level approach for reinforcing/supplementing an exterior of IT equipment.

However, abnormal climate conditions which are becoming serious recently make it more difficult to respond with only the above-described approach. Accordingly, there is a need for a method for responding to a rugged environment from a different viewpoint.

In particular, since loss of management data in a rugged environment results in loss of control authority of an available computing module, continuous data management is more essential.

SUMMARY

To address the above-discussed deficiencies of the prior art, it is a primary object of the present disclosure to provide a data replication processing method between edge management modules in a rugged environment, as a solution for providing a continuous edge service without interruption in a severe industrial site.

According to an embodiment of the present disclosure to achieve the above-described object, an edge server management module replication method includes: a step of collecting, by a first management module, environment information of an edge server; a step of managing, by the first management module, the edge server, based on the collected environmental information; a first storage step of storing, by the first management module, management data related to the edge server in a repository of the first management module; and a second storage step of storing, by a second management module, the management data stored at the first storage step in a repository of the second management module.

The second storage step may be performed at the same time as the first storage step.

The second storage step may include, when an event related to management data storage occurs at the first management module, capturing the occurring event and storing the management data.

The first management module and the second management module may synchronize the occurring event with each other.

The event may be a write system call in the first management module.

The second storage step may be performed at the same time as the first storage step when an external environment of the edge server is in a first state.

The second storage step may be performed according to a defined period when the external environment of the edge server is in a second state.

The edge server management module replication method according to an embodiment of the disclosure may further include: a step of understanding, by the second management module, a state of the first management module; a step of collecting, by the second management module, environment information of the edge server when it is understood that the first management module is in a disabled state; and a step of managing, by the second management module, the edge server, based on the collected environmental information.

An environment of the edge server may be a rugged environment.

According to another embodiment of the present disclosure, an edge server management module includes: a first management module configured to collect environmental information of an edge server and to manage the edge server, based on the collected environmental information, and to store management data related to the edge server in a repository of the first management module; and a second management module configured to store the management data stored in the first management module in a repository of the second management module.

According to still another embodiment of the present disclosure, an edge server management module replication method includes: a first storage step of storing, by a first management module, management data related to an edge server in a repository of the first management module; and a second storage step of storing, by a second management module, the management data stored at the first storage step in a repository of the second management module.

According to yet another embodiment of the present disclosure, an edge server system includes: an edge server configured to provide an edge service; a first management module configured to collect environmental information of the edge server and to manage the edge server, based on the collected environmental information, and to store management data related to the edge server in a repository of the first management module; and a second management module configured to store the management data stored in the first management module in a repository of the second management module.

According to embodiments of the present disclosure described above, the time required to respond to an error occurring in a severe industrial site can be minimized through data replication processing between replicated edge management modules in a rugged environment, so that a continuous edge service can be provided without interruption.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the present disclosure will be described in detail with reference to the accompanying drawings.

In an embodiment of the present disclosure, a method for replicating an edge management module in a rugged environment and replicating management data through this is suggested.

In a rugged environment, for example, in a poor environment in which external temperature is high temperature of 63° C. or higher or is low temperature of −21° C. or lower, management of an edge server is more important to provide a computing-intensive edge service. Accordingly, in embodiments of the present disclosure, an edge management module is replicated as a solution for preventing loss of management data.

In addition, embodiments of the present disclosure suggest a solution for replicating management data in real time by replicated edge server management modules storing the management data simultaneously.

Figure 1:
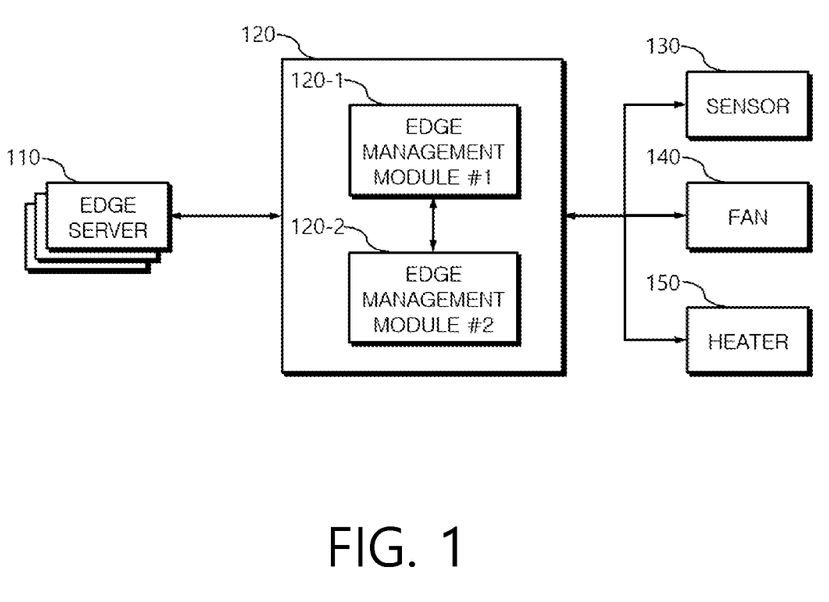
FIG. 1 is a view illustrating an edge server system to which the present disclosure is applicable.

FIG. 1 is a view illustrating an edge server system to which the present disclosure is applicable. The edge server system to which the present disclosure is applicable includes an edge server 110, an edge management module 120, a sensor 130, a fan 140, and a heater 150.

The edge server 110 is a server that is allocated resources to provide an edge service and performs edge computing. Since the edge server 110 is generated for every edge service, a plurality of edge servers may be generated.

The edge management module 120 is a module for managing and controlling the edge server 110. When necessary, the edge management module 120 may be positioned outside the edge server system.

A Redfish interface (IF) may be applied as an interface for connecting/managing/controlling the edge management module 120 and the edge server 110.

The sensor 130 is configured to collect environmental information (temperature, humidity, dusts, etc.) of the edge server system, and the fan 140 and the heater 150 are configured to control temperature of the edge server system.

The edge management module 120 includes two replicated edge management modules 120-1, 120-2. Accordingly, one of the edge management modules 120-1, 120-2 operates in an active mode to collect environmental information of the edge server system and to manages the edge server system, based on the collected environmental information.

In addition, the other one of the edge management modules 120-1, 120-2 operates in a passive mode to copy data of the edge management module operating in the active mode and to monitor a state.

Figure 2:
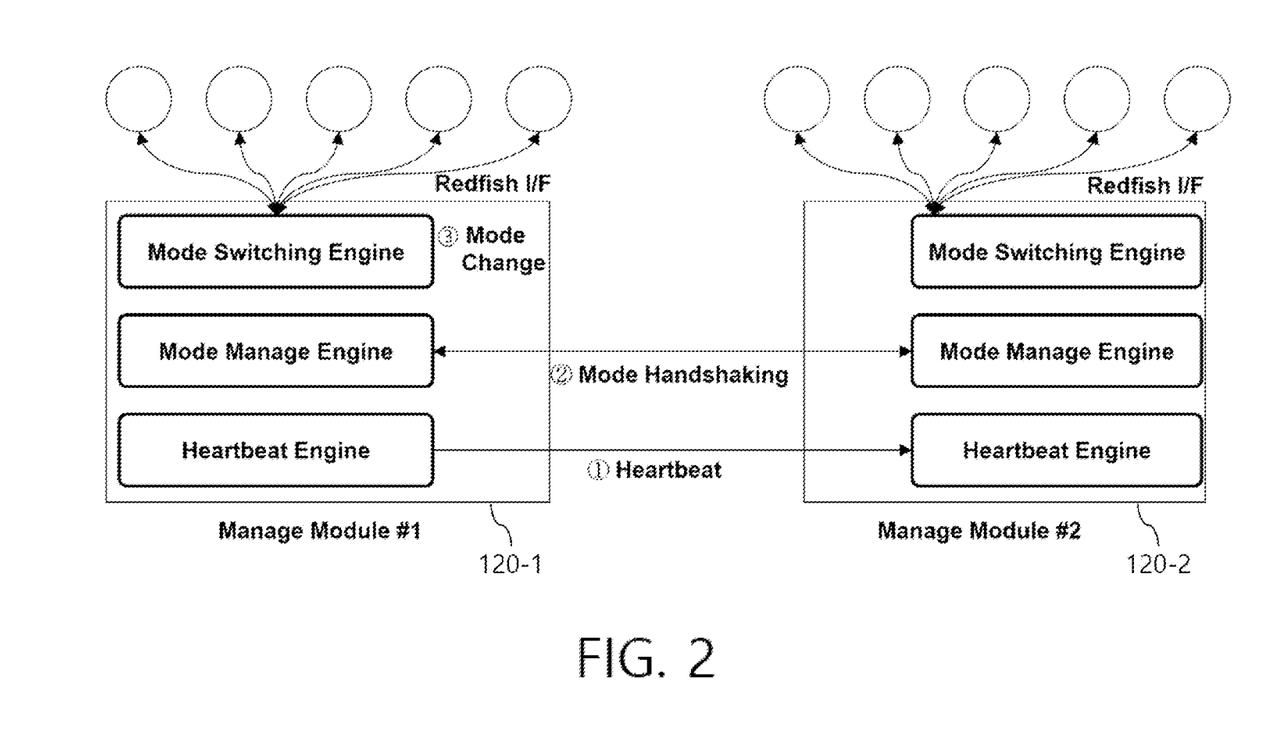
FIG. 2 is a view illustrating a concept of state monitoring and mode switching processes between replicated edge management modules.

FIG. 2 illustrates a concept of state monitoring and mode switching processes between the replicated edge management modules 120-1, 120-2.

As shown in FIG. 2, the edge management modules 120-1, 120-2 may understand each other's states by checking a heartbeat, and, when it is understood that the edge management module operating in the active mode is in a disabled state, the edge management module operating in the passive mode may be switched to the active mode, and may collect environmental information of the edge service system and may manage the edge server system.

On the other hand, the edge management module operating in the passive mode replicates data by copying data of the edge management module operating in the active mode. This process is illustrated in FIG. 3.

Figure 3:
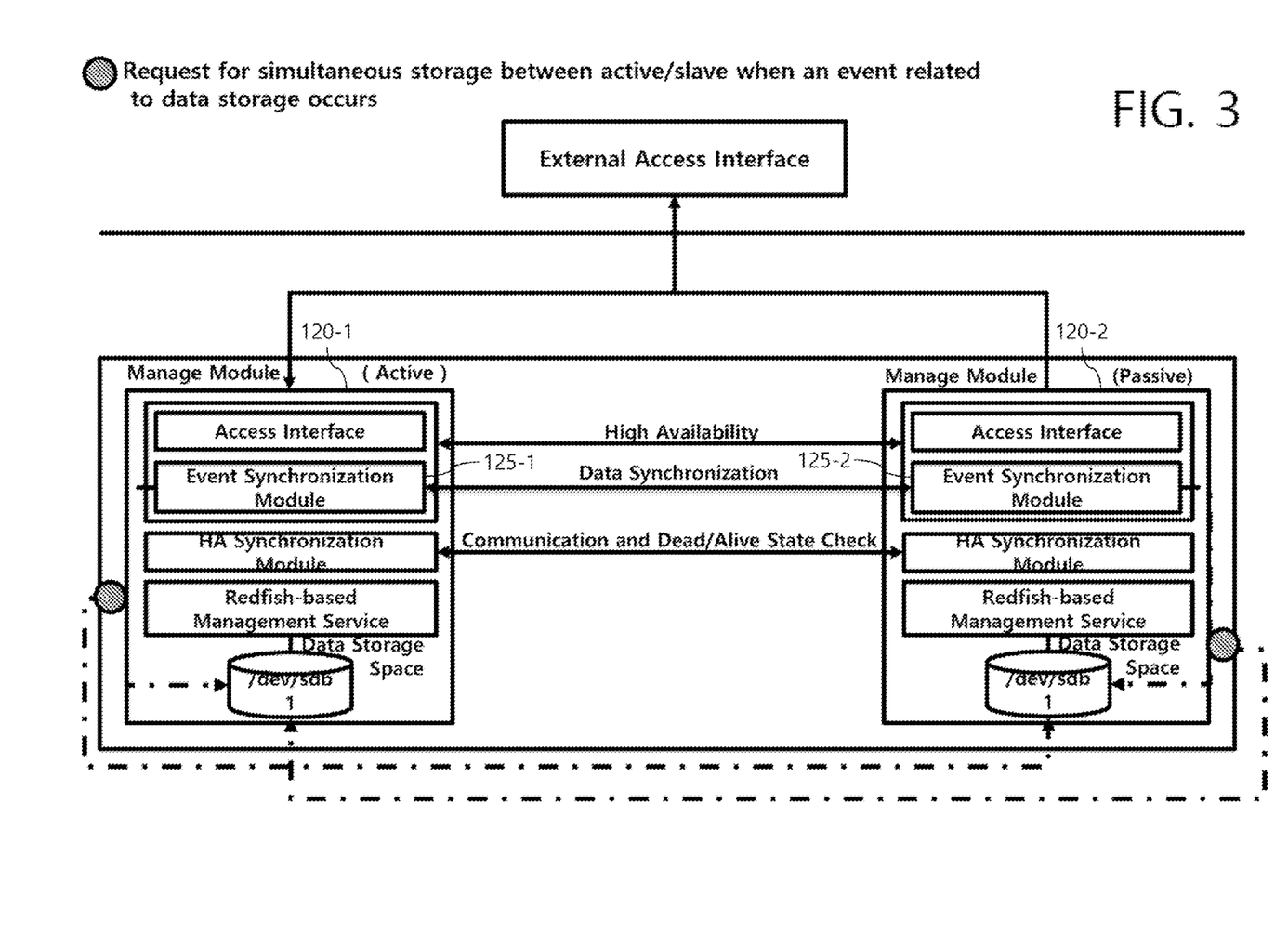
FIG. 3 is a view illustrating a process of performing data replication by copying data between edge management modules.

In FIG. 3, it is assumed that the edge management module #1 120-1 operates in the active mode and the edge management module #2 120-2 operates in the passive mode.

As shown in the drawing, the edge management module #1 120-1 stores management data that is generated in managing the edge server system in its repository.

When the management data is stored by the edge management module #1 120-1, the edge management module #2 120-2 mirrors the corresponding management data and stores the same in its repository. In addition, the edge management module #2 120-2 stores the management data at the same time as the edge management module #1 120-1 stores the management data.

To achieve this, the edge management modules 120-1, 120-2 are provided with event synchronization modules 125-1, 125-2. The event synchronization module 125-1, 125-2 is a module for synchronizing an event occurring at the edge management module 120-1, 120-2.

Specifically, when an event related to management data storage occurs at the edge management module #1 120-1 operating in the active mode, the event synchronization module 125-1 captures the occurring event and transmits the event to the edge management module #2 120-2, such that the same management data is stored in the repository of the edge management module #2 120-2 at the same time.

Figure 4:
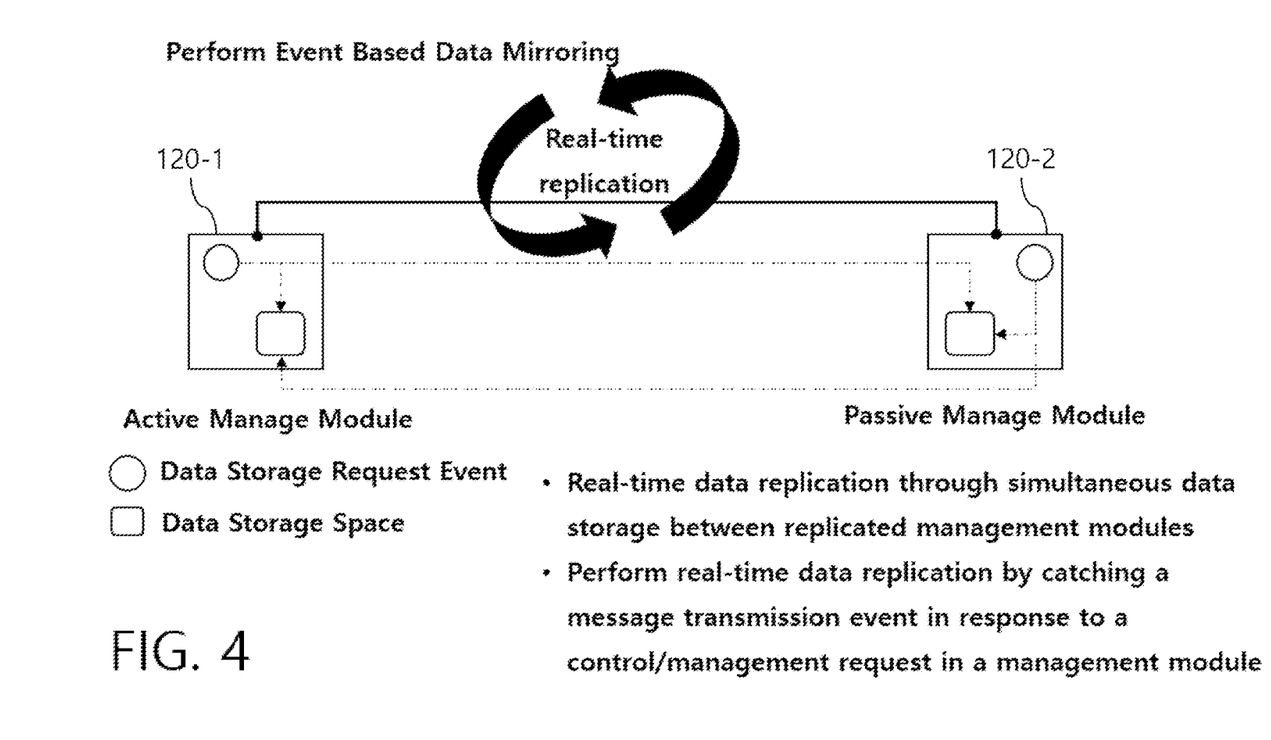
FIG. 4 is a view schematically illustrating a concept of data replication (mirroring) based on an event between edge management modules.

FIG. 4 schematically illustrates a concept of event-based data replication (mirroring) between the edge management module #1 120-1 and the edge management module #2 120-2. As shown in the drawing, an event related to data storage that occurs at any one of the edge management modules 120-1, 120-2 is transmitted to the other one in real time, and accordingly, it is identified that data is copied by capturing the event in real time. Herein, the data storage-related event may be a write system call.

The replication by the edge management modules 120-1, 120-2 themselves and the real-time replication of the management data can minimize a response time without data loss when there is a problem in the edge service in the rugged environment, and can enhance a fault tolerance function. In particular, there is an advantage that additional data verification model and step are not required due to the real-time data synchronization.

Figure 5:
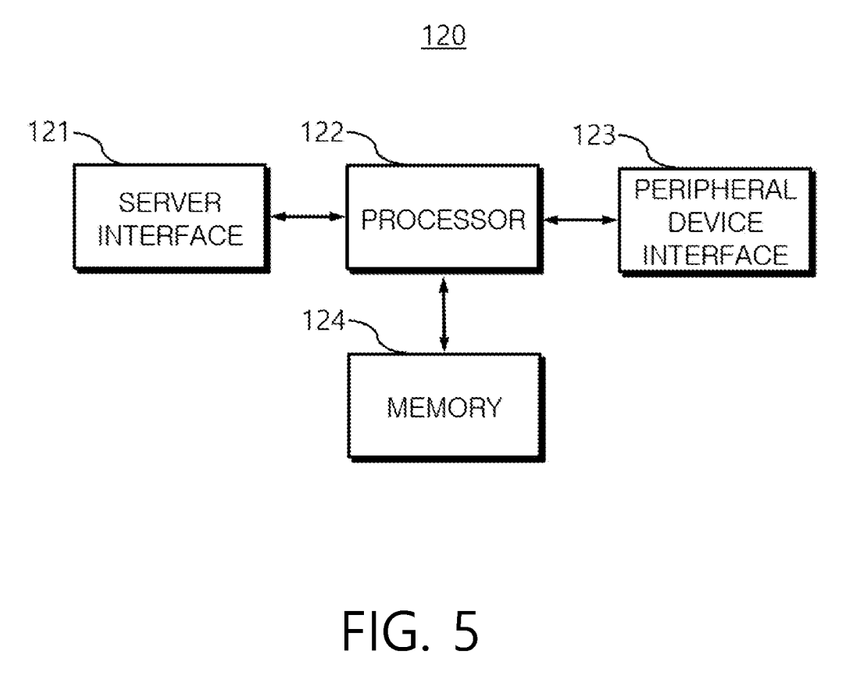
FIG. 5 is a detailed block diagram of an edge management module shown in FIG. 1.

Hereinafter, detailed configurations of the edge management modules 120-1, 120-2 shown in FIG. 1 will be described with reference to FIG. 5. Since the edge management modules 120-1, 120-2 are implemented by the same configuration, only one edge management module is illustrated. FIG. 5 is a detailed block diagram of the edge management module 120-1, 120-2.

As shown in the drawing, the edge management module includes a server interface 121, a processor 122, a peripheral device interface 122, and a memory 124.

The server interface 121 is an interface for communication connection and data communication with the edge server 110, and the peripheral device interface 124 is an interface for communication connection and data communication with the sensor 130, the fan 140, and the heater 150.

The processor 122 performs functions necessary for controlling/managing the edge server system, suggested in FIGS. 2, 3, and 4, in particular, for monitoring a state, switching a mode, and replicating data.

The memory 123 provides a storage space necessary for the processor 1220 to perform corresponding functions.

Up to now, the method for processing data replication between the management modules in the rugged environment has been described with reference to preferred embodiments.

In the above-described embodiments, it is assumed that real-time data replication between the edge server management modules is performed at ordinary times, but this is merely an example. Changes can be made such that data replication is performed according to a condition.

For example, only when an external environment of the edge server system is in a serious danger state, real-time data replication may be performed. That is, only in the corresponding state, the passive edge management module simultaneously stores management data that is generated at the active edge management module in response to a storage event.

Otherwise, the passive edge management module may replicate data by mirroring management data generated at the active edge management module intermittently according to a defined period.

Embodiments of the present disclosure suggest a real-time data replication method in a standard-based edge computing management module for providing a computing-intensive edge service in a poor environment.

Through this, internal operations are processed so as to minimize the time required to detect a system error of the management module for integrally managing/controlling the edge service providing system, and to continuously manage based on synchronized data in real time through an event driven method.

The replication configuration considering a fault tolerance operation in a rugged environment can minimize the time required to respond to an error, does not cause loss of data through event-based data synchronization in the replicated management module when an error occurs, and can reduce a data verification step for continuous integrated management through a simultaneous storing method.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. An edge server management replication method comprising:
   collecting, by a first management device, environment information of an edge server;
   controlling, by the first management device, a managing and an operating of the edge server, based on the collected environmental information;
   performing, by the first management device, a first storing of management data related to the edge server in a repository of the first management device;
   performing, by a second management device capable of managing and operating the edge server, a second storing of the management data, stored in a repository of the first management device at the performed first storing, in a repository of the second management device using a direct communication between the first management device and the second management device in response to the edge server being in a predefined state, wherein the second storing is performed using the direct communication between the first management device and the second management device at the same time as the first storing performed when an external environment of the edge server is in a first state, wherein the performing of the second storing comprises, when an event related to management data storage occurs at the first management device, capturing the occurring event and storing the management data, wherein the event is a write system call in the first management device; and
   skipping data verification for continuous integrated management through a simultaneous storing when the second storing is performed by the second management device at the same time as the first storing performed.

2. The method of claim 1, wherein the first management device and the second management device are configured to synchronize the occurring event with each other.

3. The method of claim 1, wherein the second storing is performed according to a defined period when the external environment of the edge server is in a second state.

4. The method of claim 1, further comprising:
understanding, by the second management device, a state of the first management device; collecting, by the second management device, environment information of the edge server when it is understood that the first management device is in a disabled state; and managing, by the second management device, the edge server, based on the collected environmental information.

5. The method of claim 1, wherein an environment of the edge server is a rugged environment.

6. An edge server management system comprising:
a first management device configured to collect environmental information of an edge server and to manage and/or control an operation of the edge server, based on the collected environmental information, and to perform a first storing of management data related to the edge server in a repository of the first management device; and
a second management device configured to perform a second storing of the management data stored in the first management device in a repository of the second management device using a direct communication between the first management device and the second management device, in response to the edge server being in a predefined state, wherein the second storing is performed using the direct communication between the first management device and the second management device at the same time as the first storing performed when an external environment of the edge server is in a first state , wherein the performing of the second storing comprises, when an event related to management data storage occurs at the first management device, capturing the occurring event and storing the management data, wherein the event is a write system call in the first management device, and
skip a data verification for continuous integrated management through a simultaneous storing when the second storing is performed by the second management device at the same time as the first storing performed.

7. An edge server management replication method comprising:

performing, by a first management device, a first storing of management data related to an edge server in a repository of the first management device;
performing, by a second management device, a second storing the management data, stored in a repository of the first management device at the performed first storing, in a repository of the second management device using a direct communication between the first management device and the second management device in response to the edge server being in a predefined state, wherein the second storing is performed using the direct communication between the first management device and the second management device at the same time as the first storing performed when an external environment of the edge server is in a first state, wherein the performing of the second storing comprises, when an event related to management data storage occurs at the first management device, capturing the occurring event and storing the management data, wherein the event is a write system call in the first management device; and
skipping a data verification for continuous integrated management through a simultaneous storing when the second storing is performed by the second management device at the same time as the first storing performed.

8. The method of claim 7, wherein the first management device and the second management device are configured to synchronize the occurring event with each other.

9. The method of claim 7, wherein the second storing is performed according to a defined period when the external environment of the edge server is in a second state.

10. The method of claim 7, further comprising:
understanding, by the second management device, a state of the first management device; collecting, by the second management device, environment information of the edge server when it is understood that the first management device is in a disabled state; and managing, by the second management device, the edge server, based on the collected environmental information.

11. The method of claim 7, wherein an environment of the edge server is a rugged environment.

* * * * *